Aug. 13, 1963  C. K. BROWN  3,100,350
MAGNETIC DIRECTION AND INCLINATION INDICATING DEVICE
Filed July 18, 1960  4 Sheets-Sheet 1
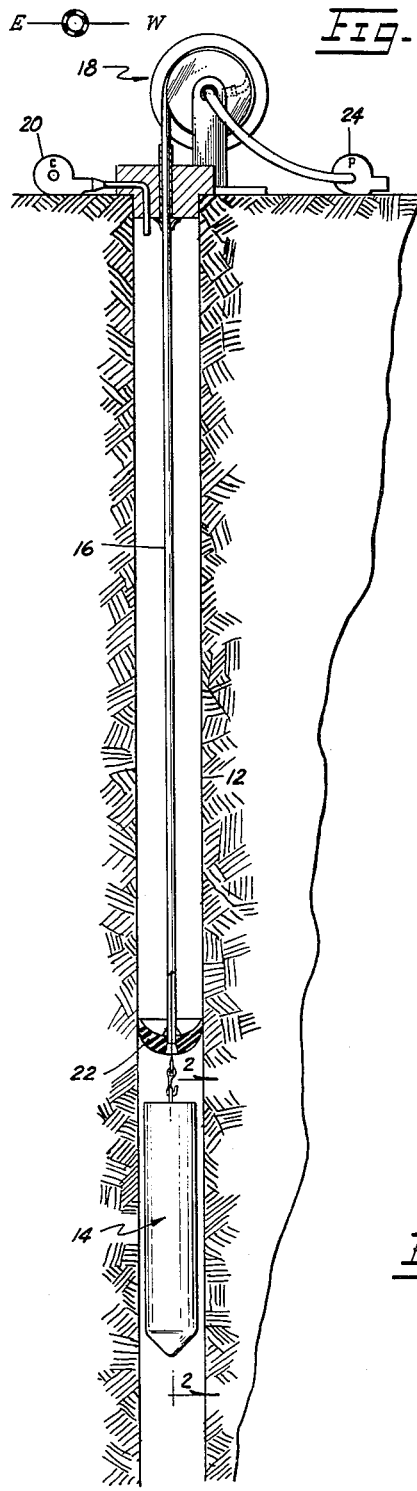
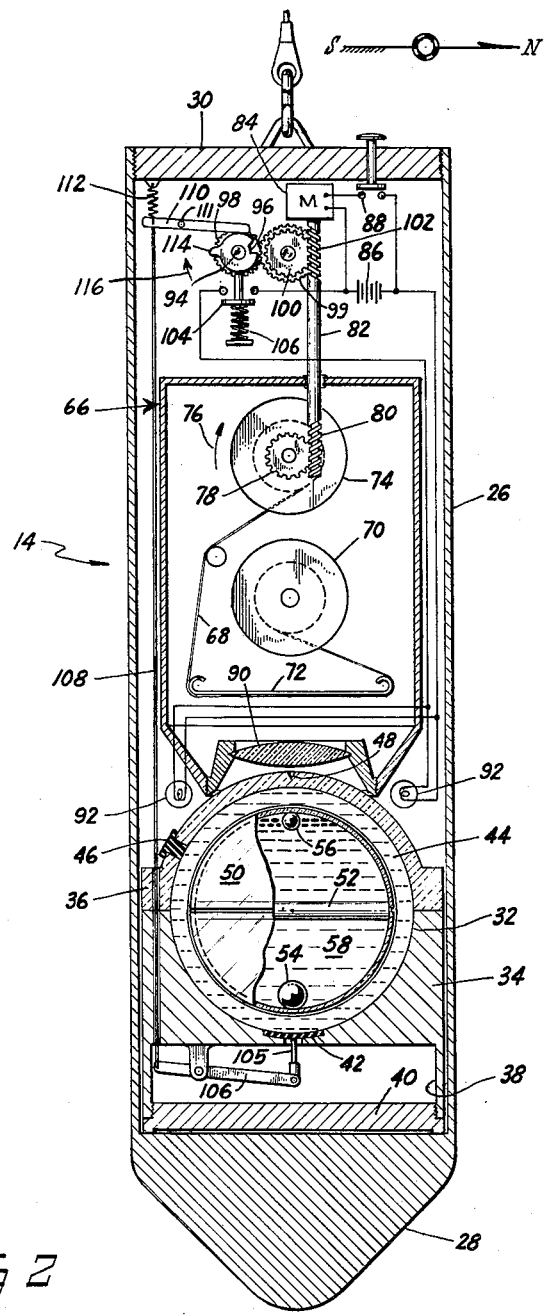
INVENTOR
CLIFFORD K. BROWN
By Stuart R. Peterson
ATTORNEY Aug. 13, 1963 C. K. BROWN 3,100,350
MAGNETIC DIRECTION AND INCLINATION INDICATING DEVICE
Filed July 18, 1960 4 Sheets-Sheet 2

INVENTOR.
CLIFFORD K. BROWN
BY
Stuart R. Peterson
ATTORNEY

INVENTOR.
CLIFFORD K. BROWN
BY
Stuart R. Peterson
ATTORNEY

United States Patent Office 3,100,350
Patented Aug. 13, 1963

3,100,350
MAGNETIC DIRECTION AND INCLINATION
INDICATING DEVICE
Clifford K. Brown, Rte. 6, Box 241, Duluth 4, Minn.
Filed July 18, 1960, Ser. No. 43,482
18 Claims. (Cl. 33—205.5)

This invention relates generally to magnetic instruments for surveying boreholes and for determining the presence of magnetic ore deposits.

One important object of the invention is to provide a device capable of denoting the direction and inclination of boreholes as well as the presence of nearby magnetic ore deposits.

Another object of the invention is to provide a device which will effectively indicate the direction and inclination of either vertical or horizontal boreholes.

The invention also has for an object the determining of a magnetic ore body or deposit as to any angle it may be situated in relative to my instrument, the instrument not being limited to any prescribed angle or range of angles.

A further object of the invention is to provide a device composed of parts such that the orientation of the elements can be easily photographed. More specifically, it is an aim of the invention to provide apparatus capable of taking a succession of pictures, thereby affording a series of permanent records which may be compared with each other in order to provide an analysis of what is occurring during the making of a borehole survey or the running of a particular traverse.

Yet another object is to provide an instrument capable of indicating magnetic conditions from various points on the earth's surface, whether on land or water, as well as from locations beneath the earth's surface.

A still further object is to provide a device that will have especial utility as a magnetic dip indicator, it being within the purview of the invention to provide a weight biasing means that will normally orient the indicating mechanism in an initial position so that deviations or changes can be readily detected.

Still another object is to provide a device that will function as a dip needle even where substantial magnetic attraction is present.

It is a still further object of the invention to provide a device of the envisaged nature that will be compact, rugged and easily employed by relatively unskilled personnel.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIGURE 1 is a sectional view of a vertical borehole illustrating my device in actual use;

FIGURE 2 is a longitudinal sectional view taken in the direction of line 2—2 of FIGURE 1 in order to show the constructional make-up of my device;

Figure 3:
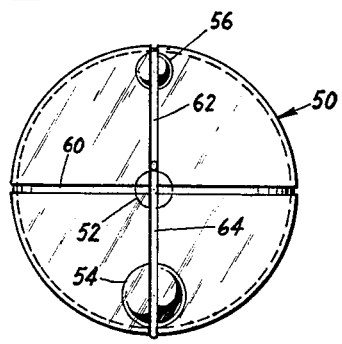
FIGURE 3 is a side view of the transparent sphere in the position it has assumed in FIGURE 2, the instant view, however, showing to better advantage the intersecting grooves disposed on the outer surface of the sphere and also a spring clip that may be added to one groove in order to impart a gravitational bias to the sphere in certain instances.

Referring first to FIGURE 1, a vertically directed borehole 12 has been illustrated. In the process of being lowered in the borehole 12 for the purpose of determining the direction and inclination of the hole, as well as any ore deposits located laterally thereof, is a device 14 exemplifying one form my invention may assume. While not constituting part of the invention, it might be well to explain that one way in which the device 14 can be lowered into the borehole has been illustrated. The depicted arrangement includes a flexible hose 16, the reason for which will presently be described, having the device 14 attached to its lower end and its upper end encircling a windlass labeled 18. When circumstances dictate, a compressor 20 can be employed to blow compressed air into the borehole 12, a resilient flange or piston 22 then being circumscribed about the lower end of the hose 16 so as to force the hose 16 and the attached device downwardly. Release of entrapped air an/or water can occur via the hose 16, and if found desirable a suction pump 24 can assist in the withdrawal of the fluid. If the pump 24 is employed, a specially constructed windlass would be utilized, its winding drum having an axial bore and radially projecting fitting (not shown) connected to the upper end of the hose 16. Otherwise, the hose 16 merely functions as a flexible cable for lowering the device 14 in a controlled manner.

Attention is now directed to FIGURE 2 where the internal makeup of the device 14 is pictorially set forth. From this view it can be readily discerned that the device 14 exemplifying the invention includes a cylindrical casing 26 having a weighted end 28, the diameter of the casing being somewhat less than that of the borehole 12 it is designed to survey. A threaded disk 30 is screwed into the upper end to close the cylinder and to also provide the means of attachment to the hose 16.

The heart of the invention will now be described. This includes a spherical chamber 32 formed by abutting two parts 34, 36 together. Normally, these parts 34, 36 will be bolted together so that they may be conveniently separated, but for the sake of discussion and drafting simplicity it will be assumed that they are cemented together with an appropriate adhesive.

The lower part 34 is formed with a depending skirt 38 having a closure disk 40 threadedly received therein, the disk having an annular rib resting on the upper side of the weighted end 28 so as to position the parts 34, 36 at a desired axial location within the cylindrical casing 26. While the need therefor will not now be completely apparent, it can be pointed out that a highly flexible diaphragm 42 (much thinner than shown) is recessed into the curved bottom of the part 34. Both the purpose of this diaphragm 42 and its flexing mechanism will best be reserved for specific explanation hereinafter.

Although both parts 34, 36 can be of transparent material, such as an acrylic plastic (Lucite or Plexiglas), because of the need for viewing the elements contained within the chamber 32, at least the upper part 36 should be of clear material in this instance. After cementing the parts 34, 36 together, liquid 44 can be introduced into the chamber through an opening normally closed by a plug 46. Although not shown, the plug 46 may have a central aperture extending therethrough which leads outwardly to a distendible bladder so that any expansion of the liquid 44 may be accommodated for, if the device 14 is used where elevated temperatures are experienced. A small conical recess or indentation 48 has been shown at the top of the part 36 for reference purposes, the recess being optional as will later become manifest.

Floated in the liquid 44 contained in the chamber 32 is a hollow spherical shell 50 (see also FIGURE 3) of transparent material such as the previously mentioned Lucite or Plexiglas. The ball or shell 50, it will be appreciated, can readily be fabricated from two hemispheres cemented together. Extending diametrically across the interior of the shell 50 is a bar-type permanent magnet 52 having a north pole at one end and a south pole at the other, as is fundamental and well understood. The ends of the bar magnet 52 are fixedly anchored to the inside of the shell 50, either by cementing to or embedding in the plastic shell. A relatively heavy ball 54 of non-magnetic metal is free to move within the shell 50, and a relatively lightweight ball 56, also of non-magnetic material, is likewise enclosed in the sphere 50. Occupying the remainder of the space within the shell 50 is a liquid 58. The ball 56, therefore, possesses a specific gravity greater than the liquid 58 and the ball 56 a specific gravity less than said liquid. Consequently, the balls 54, 56 serve as a very effective gravity responsive means by reason of which any shifting or inclination of the magnet 52 may be quickly detected, all in the manner hereinafter dealt with more fully.

Figure 4:
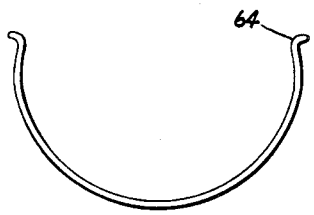
FIGURE 4 is a side elevational detail of the spring clip depicted in FIGURE 3, the clip being at right angles to that in which it appears in FIGURE 3.

As best seen from FIGURE 3, the outer spherical surface of the shell 50 is provided with a pair of circumferential grooves denoted respectively by the reference numerals 60, 62, these grooves intersecting each other at right angles at the opposite ends of the magnet 52. The grooves 60, 62 serve a dual purpose, for they provide a visible indication of the angular orientation of the shell 50 and also act to dampen the rotation of the shell by virtue of the slight resistance created with the liquid 44. In other words, the grooves 60, 62 help in bringing the shell 50 to rest. In lieu of grooves, suitable ribs might be employed. Through the agency of a non-magnetic clip spring 64 (see FIGURE 4 in particular) having a curved length slightly greater than one-half the circumference of the shell 50, a slight gravitational bias may be imparted to the shell 50 so as to provide an initial angular orientation thereof within the chamber 32. Close inspection of FIGURE 3 will reveal that the spring 64 is resiliently engaged in groove 62, thereby normally retaining the bar magnet 52 in a horizontal plane. Actually, the clip 64 will find its highest degree of usefulness in the embodiment of FIGURES 10 and 11 yet to be discussed.

Up to this point nothing has been said concerning the composition of the liquids 44 and 58. Various liquids can be used. For example, I have found kerosene satisfactory for the liquid 58. As will be made clearer when describing FIGURES 10 and 11, instead of the ball 56, a small bubble of gas (or a different liquid of lesser specific gravity than the liquid 58) can be employed, provision for the bubble then being made by not completely filling the shell 50 with the liquid 58. Regarding the liquid 44, a composite liquid has proved satisfactory. In this instance, the liquid 44 may consist of approximately two-thirds water and one-third kerosene. Water and kerosene being immiscible and of different specific gravities, the shell for a particular weight will be properly floated or suspended in the chamber 44.

It is contemplated that a sequence of records be made as the device is lowered (or raised) in the borehole 12. To this end a camera mechanism 66 is illustrated for photographing the shell or sphere 50 as it reorients itself due to magnetic changes or disturbances. While the pictured camera mechanism 66 is susceptible to rather wide modification, it will be observed that a continuous strip of photosensitive film 68 has been shown. Originally all of the film 68 is stored on a supply reel 70, then passed under a fixedly located platen 72, and after exposure is wound onto a take-up reel 74.

The direction in which the reel 74 is rotated is indicated by the arrow 76. The rotation is achieved through the agency of a worm gear 78 on the reel 74 in mesh with a worm 80 formed on the lower portion of shaft 82. The shaft 82, in this instance, is driven by a small electric motor 84 energized from a suitable power source 86 via a switch 88. In actual practice, the source 86 would be located at the upper end of the borehole 12, flexible conductors leading downwardly into the device 14. The drawing is made simpler, though, through the particular schematic arrangement that has been presented. Although not shown, the motor 84 may be energized periodically through a suitable timer. Further, the motor may be a mechanical one, say, a clockwork or escapement mechanism of the wound spring variety.

At the lower end of the camera mechanism 66 is disposed an appropriate lens unit 90 for directing light rays upwardly onto the film strip 68. At appropriate intervals a pair of lamps 92 are energized so as to illuminate the sphere or shell 50 together with the elements 52, 54 and 56 contained therein. To do this, a cam 94 having a notch 96 in its periphery may be employed. The cam 94 is rotated by means of a gear 98 mounted for rotation therewith and an idler gear 99 in back of a worm gear 100, the gear 100 being rotated by a worm 102 milled or hobbed on the shaft 82. A normally open switch 104 is in circuit with the power source 86 which is closed by a spring 106 whenever the notch 96 is rotated into juxtaposition with the switch 104.

As a precautionary measure, it is desirable that the shell 50 be jarred or knocked somewhat just before a photographic exposure of the film 68 is made. Such action is desirable to assure that the spherical shell 50 has not momentarily become "stuck" to the wall of the chamber 32. Naturally, the device 14 will frequently be encountering only small magnetic changes, yet one is in all likelihood desirous of recording whatever conditions actually exist. It is now that the purpose of the diaphragm 42 will become understandable, although other ways are possible (see for instance the arrangement suggested in FIGURE 10).

Focusing attention on the knocking mechanism, it will be seen that a plunger 105 is carried on one end of a rocker arm 106 pivotally supported intermediate its ends on the underside of the part 34. The rocker arm 106 is actuated through the agency of a vertical rod 108 extending upwardly to another rocker arm 110 pivotally supported between its ends to a fixed point 111. The end of the arm 110 to which the rod 108 is connected is biased upwardly by means of a coil spring 112, thereby urging the other end of the arm downwardly against the edge of the cam 94. A projection 114 on the cam 94 formed with an abrupt drop off periodically forces the plunger 104 upwardly against the underside of the diaphragm via the above-described intervening linkage. Such action will cause the upper side of the diaphragm to engage the shell 50. If the liquid 44 and the shell 50 together occupy the entire space within the chamber 32, then the previously mentioned bladder, when used, could be relied upon to accommodate any liquid displaced by the actuation of the diaphragm; otherwise a needle-like plunger similar to that shown in FIGURE 11 would be employed. The abrupt drop off on the trailing side of the projection 114 will permit the diaphragm 42 to quickly spring away from the shell 50, thereby making certain that the sphere is then actually floating. Even where no knocking mechanism is employed or should the mechanism for some reason fail to function properly, the shifted condition of the balls 54, 56 will immediately indicate in any given picture that the shell 50 is not freely buoyed. It will be understood that the cam 94 is caused to rotate in the direction of arrow 116 and that the projection 114 is angularly located in relation to the notch 96 so that the jarring of the shell or sphere 50 occurs immediately before closure of the switch 104 and the resulting turning on of the lights 92. If desired, it may be preferable, a shutter may be employed in conjunction with the taking of pictures. Various electrical or mechanical shutter arrangements are possible, the most logical in connection with the illustrated mechanism being a solenoid operated shutter energized via the switch 104.

Having in mind the foregoing construction and arrangement of the principal elements comprising the embodiment 14, it is believed that a more complete understanding of my invention may now be had from a description of its operation and manner of use. With the switch 88 closed, the motor 84 will advance the film strip 68 past the lens unit 90. Immediately after the plunger 104 has been actuated, the lamps 92 will be energized to take a picture of what is presented beneath the lens unit 90.

Figure 5:
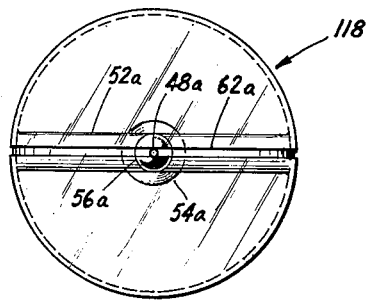
FIGURES 5–8 are typical photographs that might result from specified conditions encountered with the device as illustrated in FIGURE 2 and its associated camera mechanism.

If the bar magnet 52 is residing in a horizontal plane and is unaffected by any extraneous magnetic fields other than the earth's own magnetic field, the full length of the magnet will appear in a picture taken under these conditions. Such a relationship is depicted in what is intended to be a simulated photograph labeled 118 in FIGURE 5. Because what is shown in FIGURE 5 is an image, that is, what the camera sees, the elements have been distinguished from the actual elements of FIGURE 2 by the suffix "a." To simplify things, it will be assumed that the spring clip 64 is not being employed, thereby avoiding any need for showing its image. In this regard, it will be appreciated that the device is operable without any added weighting, such as would be provided by the clip 64. The information derived from the picture 118 is that the borehole 12 is truly vertical at the moment and that there are no magnetic ore deposits in the vicinity. It is also apparent from this picture that the shell 50 is not stuck against the inner surface or wall of the chamber 32, for then the balls 54, 56 would appear displaced or misaligned with the magnet 52.

Figure 6:
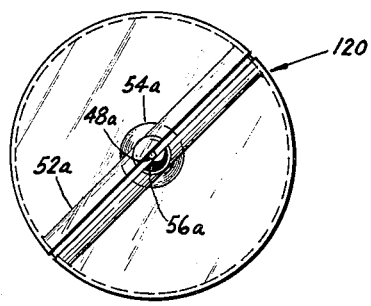

In FIGURE 6 a slightly different story is presented. Here the picture 120 signifies that an ore deposit has caused the magnet 52 to shift from its normal north and south direction. Inasmuch as the magnet 52 is fixedly disposed within the freely buoyed shell 50, the shell has of course turned with the magnet, as evidenced by the direction the groove image 62a and the magnet image 62a now extend.

Figure 7:
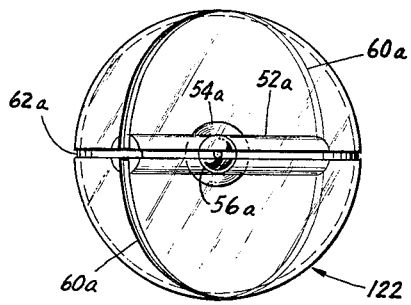

FIGURE 7 tells even a different story, for here the photograph 122 indicates that the device 14 is approaching an ore deposit or body that is at an elevation somewhat beneath the depth of the device 14, but in a north-south direction. This is clearly denoted both because the image 52a is shorter and a segment of the groove 62 has come into view, the image being represented by 62a.

Figure 8:
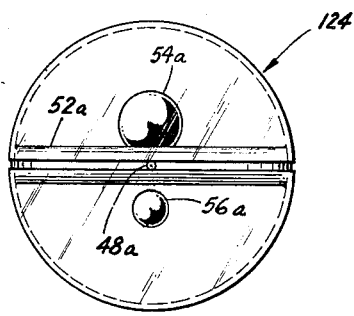

In FIGURE 8, the photograph designated by the numeral 124 informs us that the borehole 12 is not truly vertical because the images 54a, 56a have been shifted in this picture with respect to their preceding position. Other than this, though, the same conditions prevail as in photograph 118 of FIGURE 5.

The photographs 118–124 have been purposely made quite simple in order to demonstrate conditions that can occur. It will be understood that various combinations of these conditions may take place simultaneously. However, each photograph will faithfully record what is then happening. By comparing successive photographs an accurate plot of conditions and the changes that have transpired can be realized. Although not illustrated in any of the views, the person entrusted with the analysis can make use of a grid network that may be superimposed over the various photographs in order to ascertain specific values for the deviations that have arisen in surveying the borehole 12.

Figure 9:
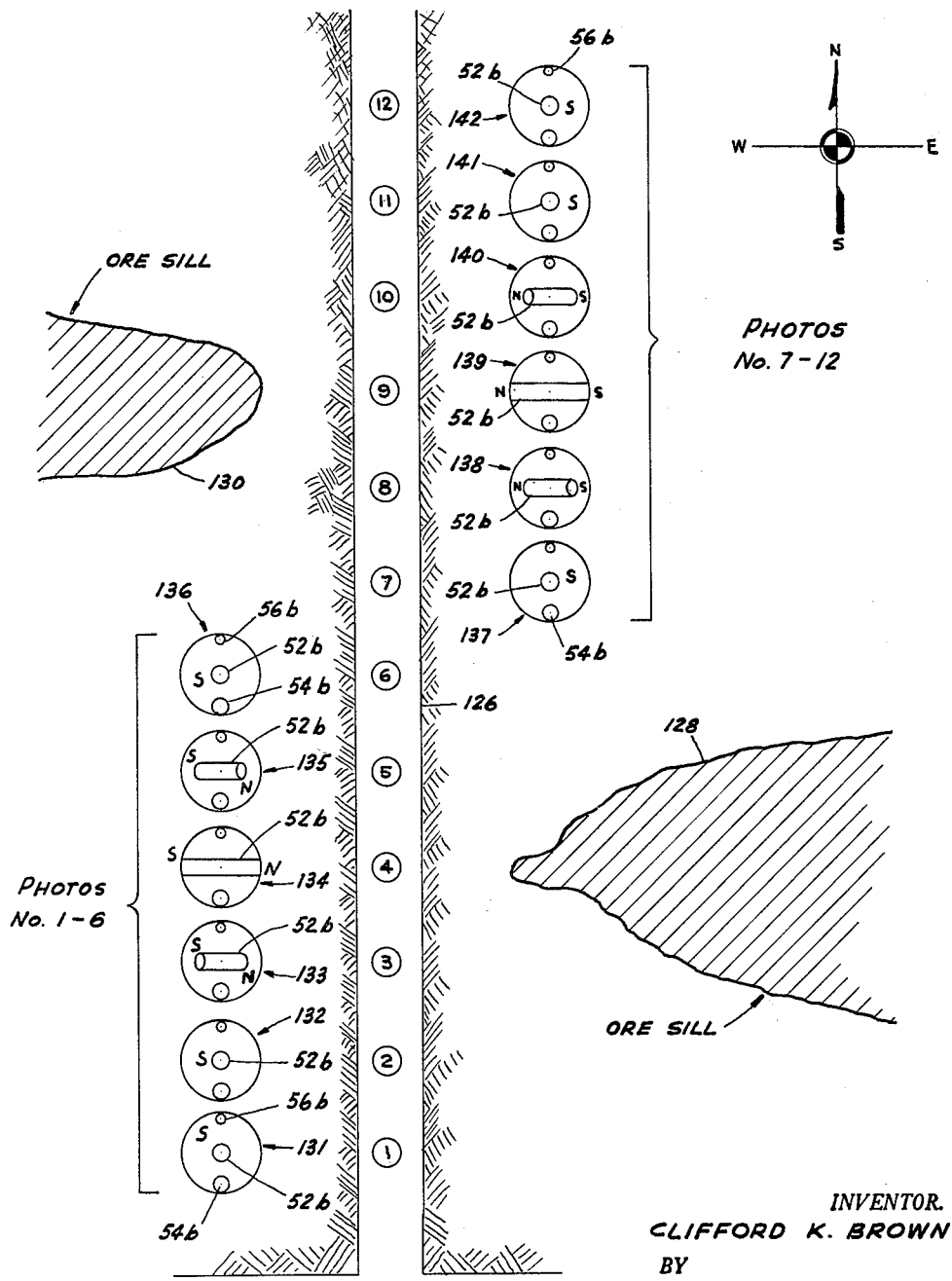
FIGURE 9 is a plan sectional view of a horizontal borehole illustrating a sequence of pictures that might result as the device is advanced through the borehole.

Possibly even a better idea as to the practicality of my device 14 can be obtained by resort to FIGURE 9. Here a horizontal borehole 126 has been shown, running in what will be assumed to be a northerly direction. We will further assume that a picture is taken at progressive locations or stations numerically designated and encircled, the stations being numbered from 1 to 12. Corresponding numbers may be placed on the photographs in various ways, if desired. Still further, it will be assumed that a first magnetic ore sill or deposit labeled 128 is to the east of the borehole 126 and a second such sill or deposit 130 is to the west.

At station #1 the camera mechanism 66 is taking its first picture 131 and sees only the south end of the magnet 52, the magnet image appearing as 52b in this series of photographs. It will be remembered that we are following a northerly course, the magnet 52 aligns itself in the earth's field with its south pole nearest the lens unit 90. No change is signified in the second photograph 132 which is taken at station #2.

As the device 14 comes into the modified magnetic field due to the presence of sill 128, the magnet 52 is reoriented to the extent appearing in photograph 133. However, when abreast of the sill 128, the camera mechanism 66 catches the full length of the magnet 52, this being the condition recorded in picture 134. As the device moves beyond the sill 128, the orientation captured in picture 135 results. Picture 136, taken at station #6, is the same as photographs 131 and 132.

Likewise, station #7 produces an unaltered position of the magnet 52, the effect of the sill 130 not yet having shifted the magnet from its north-south position shown in photograph 134. However, picture 138 represents an initial shift, whereas picture 139 represents a full 90° shift. Picture 140 indicates that by the time station #11 is reached the effect of sill 130 is beginning to ebb. No influence is recorded in the final picture 142 taken at station #12 other than the normal action of the earth's magnetic field.

In interpreting the photos it must be borne in mind that the photo frame will have a constant position mark, that the possible limit of meander in a drill hole for a given distance is known and that core information may be available. The above information and knowledge coupled with the photos, whose frequency of taking can be adjusted, will permit the determination of useful information as to direction and inclination of a borehole as well as the existence and general direction of magnetic ore attraction within a borehole.

Figure 10:
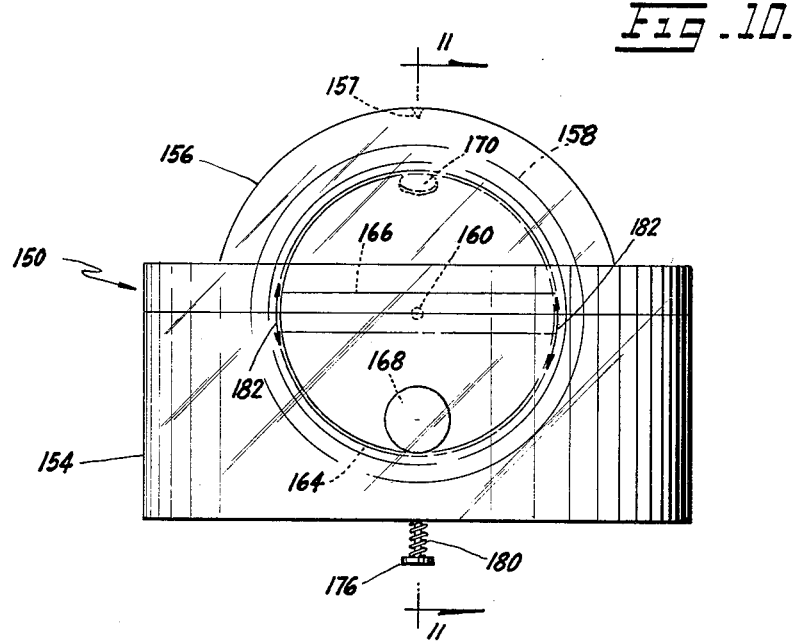
FIGURE 10 is a side elevational view of a somewhat modified device, this device being primarily intended for surface explorations.
Figure 11:
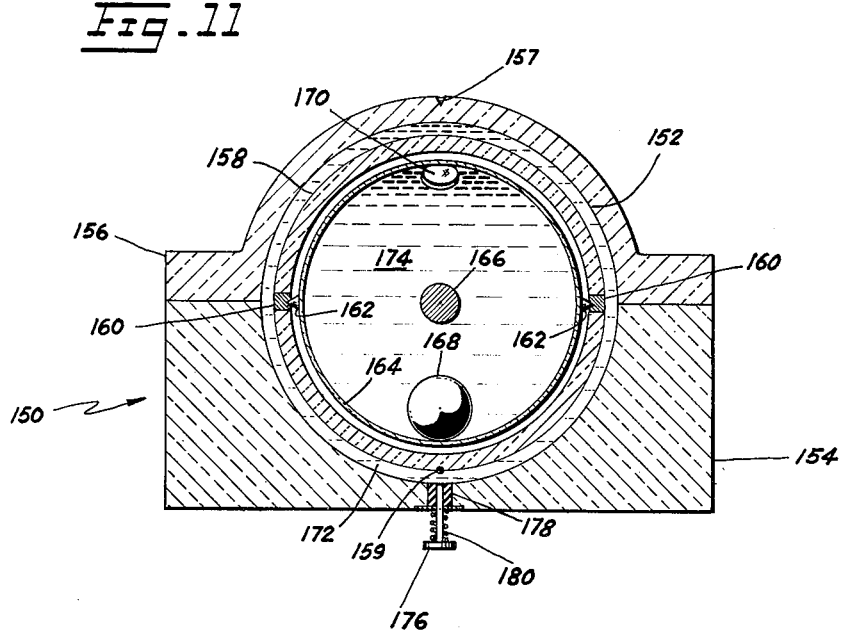
FIGURE 11 is a sectional view taken in the direction of line 11—11 of FIGURE 10.

To illustrate further the versatility of the invention, reference will now be made to the embodiment denoted generally by the numeral 150 in FIGURES 10 and 11. The device 150 is especially suited for running lines and observing any dip or inclination at prescribed intervals on the earth's surface. It is envisaged that the instant modification will find utility in conducting surveys on either land or water. Although the device 150 exhibits a marked similarity to the previously described embodiment 14, sufficient differences exist to warrant using distinguishing reference numerals. Forming a spherical chamber 152 in this instance are lower and upper parts 154, 156. In the device 14 only the upper part 36 was deemed to be transparent; here both parts 154 and 156 are preferably of clear material. As with the part 36, the part 156 is formed with a small conical recesses or indentation 157 corresponding in function to the recess 48 in the top of the part 36.

Within the spherical chamber 152 is a ball or shell 158, also of transparent material. As will become clearer when the operation of this embodiment is described, the need for a clip spring 159 corresponding to the earlier-mentioned spring 64 is greater because of the type of survey to be conducted. Press fitted into diametrically opposite apertures are bearing elements 160, preferably in the form of small jewels.

Conical pintles 162 project into the bearings 160, these being fixedly carried on the exterior of a second transparent spherical shell 164. It is the second shell 164 that houses a permanent bar magnet 166 which may be identical to the magnet 52. Also enclosed in the shell 164 is a non-magnetic ball 168 which gravitationally rolls to the lowest possible segment of the shell 164. Instead of the lighter weight ball 56, an air bubble 170 assists in the alignment role here, although the ball 56 may be used if desired.

The first-mentioned shell 158 is floated in a liquid 172 which may be of the same type as the previously referred to liquid 44. Likewise, the liquid within the inner shell 164, denoted by the numeral 174, may be the same as the liquid 58. However, space will be left in filling the shell 164 so as to provide the bubble 170.

Here again, it is highly desirable to have some arrangement for jarring the shell 158, thereby assuring that it is not adhering to the inside wall of the chamber 152 when a reading (or picture) is being made. At the outset it might be explained that this same mechanism could be used in the device 14 and vice versa. What has been shown is a plunger 176 that extends upwardly through a resilient grommet 178 in the lower part 154, the plunger and grommet forming a liquid-tight seal. The plunger 176 is biased downwardly by means of a coil spring 180, the spring 180 readily yielding to sufficient finger pressure when it is desired to jar or knock the shell 158.

In actual use, the device 150, as already indicated, will have considerable value in running a line where magnetic inclination or magnetic dips are to be determined. The superiority of the device 150 for this type of operation stems to some extent from the sensitivity or ease with which the magnet may pivot or dip in the direction of the arrows 182. Not only is the first shell 158 free to orient itself in the chamber 152, but the second shell 164 is pivotally mounted within the shell 158. The combined freedom thus afforded provides assurance that any magnetic attraction will produce a tilting of the magnet 166 in either a clockwise or counterclockwise direction as viewed in FIGURE 10.

While various sighting lenses and/or recording devices might be employed in conjunction with the device 150, depending on whether it is water borne, hand carried, etc., it is believed manifest that sufficient structure has been presented for carrying out the broad objectives of the invention as far as dip explorations are concerned. If hand carried, one has only to look vertically downwardly to see the top of the magnet 166 and be guided by the direction it aligns itself as to the course to be traveled. Any dip or inclination can be visually noted by the apparent shortening of the magnet 166, when looking downwardly, or any tilting of said magnet, whne looking from the side (as would be the situation when viewing FIGURE 10).

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A magnetic indicating device comprising a spherical shell of transparent material having a smooth interior, a magnet fixedly disposed within said shell, gravity responsive means also within said shell and freely movable relative to said magnet, and means for buoyingly supporting said shell in a liquid medium so that said shell can orient itself in accordance with the field forces to which said magnet is subjected.

2. An indicating device in accordance with claim 1 in which said gravity responsive means includes a relatively small ball contained in said shell having a specific gravity greater than that of the fluid medium within said shell.

3. An indicating device in accordance with claim 1 in which said gravity responsive means includes a liquid and a relatively small amount of fluid having a lesser specific gravity than said liquid so as to form a bubble.

4. An indicating device in accordance with claim 1 in which said gravity responsive means includes a liquid and a float member.

5. An indicating device in accordance with claim 1 including indicia fixedly disposed on said shell so as to indicate changes in shell orientation when viewed from a given direction.

6. An indicating device in accordance with claim 5 including means fixedly located with respect to the supporting means for said shell for recording said changes in shell orientation.

7. An indicating device in accordance with claim 6 in which said recording means is a camera, and means for providing a sequence of exposures in order to produce a series of pictorial records.

8. A magnetic indicating device comprising a spherical shell of transparent material having a smooth inner surface, a bar magnet fixedly disposed within said shell and having its ends anchored to the walls of said shell at diametrically opposite locations, the outer surface of said shell having a pair of circumferential grooves intersecting each other perpendicularly at the poles of said magnet, a relatively small opaque ball contained in said shell and free to roll on the inner surface thereof, and hollow means encasing said shell containing a liquid medium for freely buoying said shell, said hollow means having at least a portion thereof of transparent material through which the physical relationship of said magnet, ball and grooves may be viewed.

9. An indicating device in accordance with claim 8 including photographic means for recording said last-mentioned relationship.

10. An indicating device in accordance with claim 9 including means for jarring said shell just before recording said relationship.

11. An indicating device in accordance with claim 8 including a curved spring member resiliently engaged in a segment of one of said grooves so as to gravitationally bias said shell into a particular initial orientation.

12. A magnetic indicating device comprising a first spherical shell of transparent material, a second transparent spherical shell having a smooth inner surface, diametrically spaced bearing means pivotally mounting said second shell within said first shell for rotation about one axis, a magnet fixedly disposed within said second shell, gravity responsive means also within said second shell and freely movable relative to said magnet, and means for buoyingly supporting said first shell in a liquid medium composed of two liquids having different specific gravities, whereby said shells can orient themselves in accordance with the field forces to which said magnet is subjected.

13. An indicating device in accordance with claim 12 in which said means for buoyingly supporting said first shell is transparent and includes a spherical chamber, and in which the total specific gravity of the floated shells and their contained mass is between the specific gravities of said two liquids.

14. An indicating device in accordance with claim 13 in which said gravity responsive means includes a non-magnetic ball having a specific gravity greater than the liquid within said second shell.

15. An indicating device in accordance with claim 14 including a reference mark fixedly located on said supporting means.

16. An indicating device in accordance with claim 13 including a spring biased plunger extending into said chamber for knocking said first shell.

17. A magnetic indicating device comprising a spherical shell of transparent material having a smooth inner surface, a magnet fixedly disposed within said shell, gravity responsive means also within said shell and freely movable relative to said magnet, hollow means encasing said shell having at least a portion thereof transparent so that the relationship of said magnet and gravity responsive means may be observed, and a fluid medium interposed between said shell and encasing means composed of immiscible liquids of different specific gravities so that said shell will be suspended within said encasing means.

18. An indicating device in accordance with claim 17 in which said immiscible liquids are water and kerosene.

References Cited in the file of this patent

UNITED STATES PATENTS

| | | |
|---|---|---|
| 216,759 | Randolph | June 24, 1879 |
| 994,901 | Barbow | June 13, 1911 |
| 1,877,593 | Roman | Sept. 13, 1932 |
| 2,098,476 | Webster | Nov. 9, 1937 |
| 2,192,148 | Otto | Feb. 27, 1940 |
| 2,313,168 | Opocensky | Mar. 9, 1943 |
| 2,746,162 | Picard | May 22, 1956 |